3,152,675
DRIVE CONNECTION FOR
AUTOMOTIVE VEHICLE
Jean Cadiou, Paris, France, assignor to Societe Anonyme
Andre Citroen, Paris, France
Filed Jan. 30, 1962, Ser. No. 169,829
Claims priority, application France, Jan. 30, 1961,
851,109, Patent 1,287,432
1 Claim. (Cl. 192—3.2)

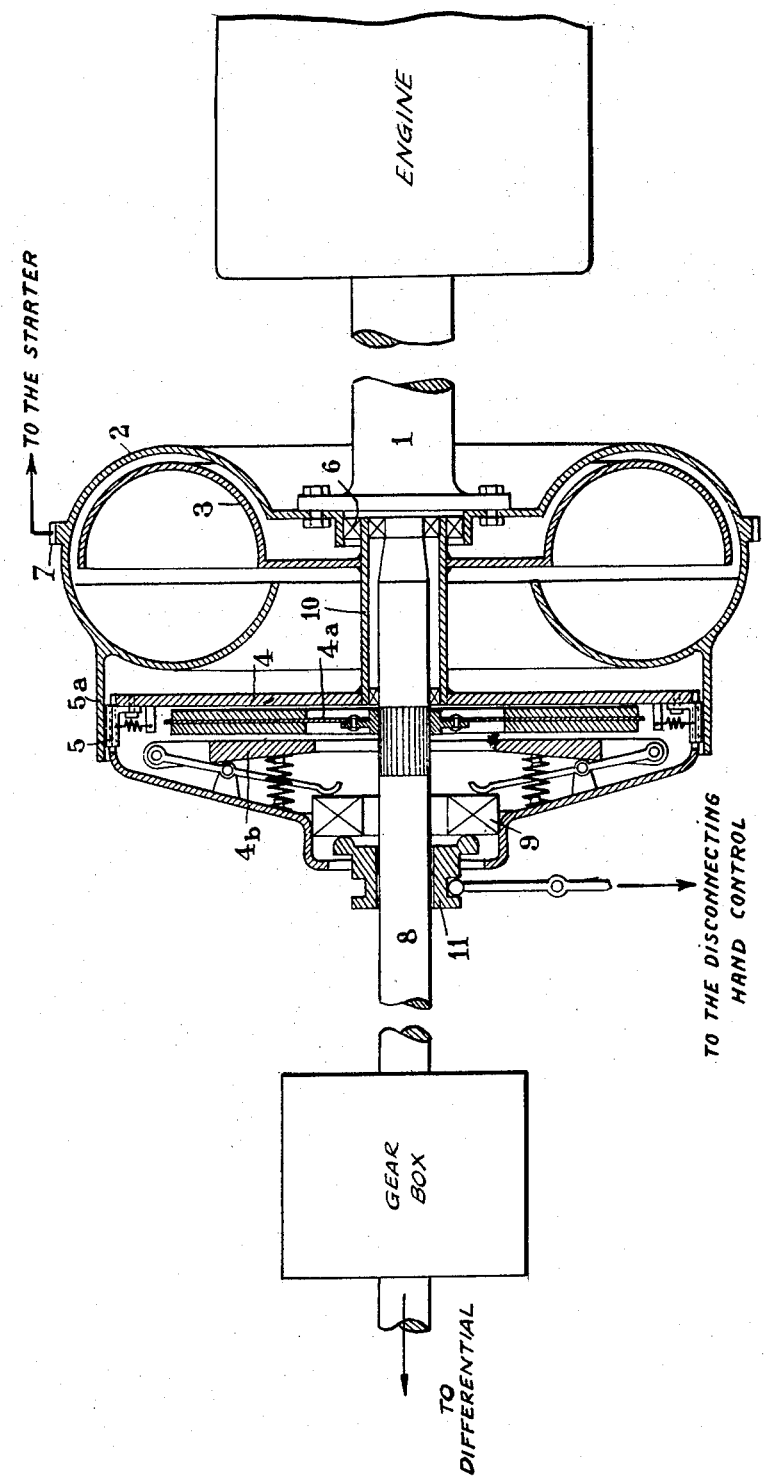

This invention relates in general to drive connection, notably for automotive vehicles, and has specific reference to an improved mechanism to be mounted between the engine shaft and the change-speed mechanism in an automotive vehicle.

Various devices have already been proposed with a view to facilitate the low-speed driving of automotive vehicles during accurate manoeuvres in garages or in town streets. Many devices of this character are based on the use of automatic change-speed mechanisms, and other devices are attended by considerable mechanical complication.

It is a first object of this invention to provide a drive connection ensuring all the desirable manoeuvering facilities through a relatively simple construction and without resorting to unduly complicated automatic systems.

Another object of this invention is to provide a drive connection comprising a hydraulic coupling or torque converter constituting an efficient yet simple means for ensuring a very smooth operation.

It is another object of this invention to provide a drive connection comprising a hydraulic coupling or torque converter characterized by a complete absence of power loss under normal operating or driving conditions.

Furthermore, this invention provides as a complementary object a drive connection comprising a hydraulic coupling or hydraulic torque converter adapted to become inoperative when the output shaft revolves at a speed greater than a predetermined limit angular velocity.

In this drive connection the engine or input shaft and a transmission or output shaft are rotatably rigid respectively with the two driving and driven members or shells of a hydraulic coupling or a hydraulic torque converter, the transmission or output shaft being provided with a centrifugal clutch device adapted rotatably to lock said shaft relative to the aforesaid driving member when the velocity of rotation of said transmission shaft exceeds a predetermined limit value.

This provision of a centrifugal clutch device in the transmission connected to the differential is extremely advantageous in that the engine can be accelerated for parking and like low-speed manoeuvres without causing any premature engagement of the centrifugal clutch, so that the smoothness and progressiveness of the hydraulic coupling is preserved. This appreciable result is not obtained with the known transmission arrangements wherein the centrifugal clutch device is engaged by the engine shaft when the latter exceeds a predetermined limit angular speed.

The features and advantages of this invention will appear more completely from the following description with reference to the attached drawing of which the single figure illustrates diagrammatically in axial section, by way of example, a typical embodiment of the invention.

On the output end or driving flange 1 of the crankshaft of the engine (not shown) the first shell or driving member 2 of a hydraulic coupling is secured for example by bolting, together with one element of a freewheel device 6 the other element of which is rigid with a tubular intermediate shaft 10 also rigid with the other shell or driven member 3 of the hydraulic coupling. This freewheel device is so mounted that the engine can rotate without exerting any mechanical action on the other shell or driven member 3 while transmitting, if necessary, the drive from this member 3 to the engine. The intermediate shaft 10 has rigidly secured thereon a clutch plate 4 co-acting on the one hand with a friction disc 4a splined with the transmission shaft 8 of the mechanism and on the other hand with another disc 4b providing in the conventional manner the clutch engagement pressure under the control of a conventional sliding ring 11 acting through the medium of a thrust ball-bearing 9.

The clutch plate 4 carries a number of centrifugal weights 5 having their outer faces lined with a suitable friction material and rotatably mounted on pivot pins extending at right angles to the plate, adequate springs (shown only in diagrammatical form in the drawing) urging these inertia weights toward the axis of the clutch plate. The centrifugal weights 5 and their pivot pins should be constructed with a view to reduce frictional contacts to a minimum in order to provide a very accurate operation. The friction linings of these centrifugal weights 5 are adapted to contact a cylindrical extension 5a of the first shell or driving member 2 of the hydraulic coupling.

Finally, the first shell 2 carries a toothed annulus 7 through which the starter motor (not shown) may drive the engine for starting purposes.

This transmission operates as follows:

When the starter motor is energized, it drives the toothed annulus 7 formed integrally with the first shell 2 rigid with the engine shaft 1. If the storage battery is discharged or if the starter motor cannot be energized or operated for any other reason, the engine may be started through the transmission shaft 8, the clutch 4, the tubular intermediate shaft 10 and the freewheel device 6.

When starting the vehicle from rest in first speed or reverse, or for any low-speed manoeuvre requiring accurate driving, the engine torque is transmitted from the output shaft 1 of the engine through the hydraulic coupling 2, 3, the clutch plate 4 and the friction disc 4a to the transmission shaft 8. Under these conditions, the drive is obtained by accelerating moderately, and the vehicle can be stopped or controlled by slightly applying or releasing the brakes.

When the rotational speed of the driven member 3 of the hydraulic coupling and therefore of the intermediate shaft 10 rigid therewith exceeds a predetermined limit value, the centrifugal device 5 becomes operative and causes the clutch plate 4 and the other shell or driven member 3 to revolve bodily with the first shell or driving member 2. Thus, the hydraulic coupling becomes inoperative and the torque is transmitted without slipping and therefore without any loss of power. It is up to the manufacturer to determine the optimum value for each vehicle of the maximum velocity of rotation of the driven member of the hydraulic coupling whereat the centrifugal clutch becomes operative and the driven member of the hydraulic coupling is rotatably solid with the driving member. This limit speed is slightly greater than that necessary for usual parking manoeuvres as well as for low-speed manoeuvres performed in first gear or reverse.

When the vehicle is stopped on a declivity and if the change-speed mechanism is not in neutral, the engine may complete the action of the hand-brake. To this end, the driver simply engages the transmission gear corresponding to the direction in which the vehicle tends to move under the influence of gravity, that is, in low gear downhill or in reverse uphill and engages clutch 4—4a. The freewheel device 6 is thus locked and holds the transmission and driven shaft 8 against rotation.

The drive connection according to this invention is advantageous not only in that it provides a smooth operation due to the provision of the hydraulic coupling, but also because it prevents the engine from stalling in case of sudden stoppage. This advantage may be obtained through the known use of a centrifugal clutch, but in the device of this invention it is the hydraulic coupling that becomes operative when the engine speed is reduced to idling values.

Of course, if it is desired to take advantage of the well-known torque converting properties of a hydraulic torque converter the simple hydraulic coupling 2, 3 of the construction described hereinabove and illustrated in the accompanying drawing may be replaced by any converter of a type suitable for converting the torque contemplated.

Besides, many modifications and variations may be brought in the specific example shown and described herein without departing from the spirit and scope of the invention as set forth in the appended claim.

What I claim is:

For an automotive vehicle comprising an engine, an output shaft of said engine, a transmission and a transmission shaft, a drive connection between said engine output shaft and said transmission shaft, said drive connection comprising a hydraulic coupling having a driving member rotatably rigid with said engine output shaft and provided with an integral cylindrical extension directed toward said transmission and a driven member having an integral extension in the form of a tubular intermediate shaft directed toward said transmission and rotatably mounted coaxially to and around said transmission input shaft, a clutch plate rigidly mounted about said tubular intermediate shaft within said cylindrical extension of said driving member of said hydraulic coupling, a friction disc splined about said transmission shaft and thus free to slide in front of said clutch plate, clamping means for urging said friction disc against said clutch plate for causing said transmission input shaft to revolve bodily with said driven member of said hydraulic coupling, and centrifugal clutch means mounted on the outer periphery of said clutch plate about said friction disc, said centrifugal clutch means cooperating with said cylindrical extension of said driving member of said hydraulic coupling whereby said driven member of said hydraulic coupling is caused to revolve bodily with said driving member of said hydraulic coupling when said driven member rotates at a speed greater than a predetermined value.

References Cited in the file of this patent

UNITED STATES PATENTS

| | | |
|---|---|---|
| 2,267,334 | Keller | Dec. 23, 1941 |
| 2,333,680 | Schneider et al. | Nov. 9, 1943 |
| 2,404,657 | Roberts et al. | July 23, 1946 |
| 2,442,840 | Carnagna | June 8, 1948 |
| 2,633,952 | Zeidler | Apr. 7, 1953 |

FOREIGN PATENTS

| | | |
|---|---|---|
| 409,378 | Great Britain | Apr. 30, 1934 |
| 1,085,404 | France | July 28, 1954 |